(12) United States Patent
Natanov et al.

(10) Patent No.: US 8,286,133 B2
(45) Date of Patent: Oct. 9, 2012

(54) FUZZING ENCODED DATA

(75) Inventors: Nissim Natanov, Redmond, WA (US); John Neystadt, Kfar Saba (IL)

(73) Assignee: Microsoft Corporation, Redmond, WA (US)

( * ) Notice: Subject to any disclaimer, the term of this patent is extended or adjusted under 35 U.S.C. 154(b) by 1307 days.

(21) Appl. No.: 11/959,478

(22) Filed: Dec. 19, 2007

(65) Prior Publication Data

US 2009/0164975 A1 Jun. 25, 2009

(51) Int. Cl.
*G06F 9/45* (2006.01)

(52) U.S. Cl. .......................................... 717/124
(58) Field of Classification Search .................... 717/124
See application file for complete search history.

(56) References Cited

U.S. PATENT DOCUMENTS

| | | | |
|---|---|---|---|
| 5,485,409 A | 1/1996 | Gupta et al. | |
| 5,982,932 A | 11/1999 | Prokoski | |
| 6,625,764 B1 | 9/2003 | Dawson | |
| 6,701,460 B1 | 3/2004 | Suwandi et al. | |
| 7,051,322 B2 | 5/2006 | Rioux | |
| 7,131,036 B2 | 10/2006 | Wray et al. | |
| 7,191,172 B2 | 3/2007 | McGrath et al. | |
| 7,926,114 B2 * | 4/2011 | Neystadt et al. | 726/25 |
| 8,136,095 B2 * | 3/2012 | Natanov et al. | 717/126 |
| 2004/0111727 A1 | 6/2004 | Schwarzbauer et al. | |
| 2005/0131751 A1 | 6/2005 | Ahlers et al. | |
| 2005/0135260 A1 | 6/2005 | Todd | |
| 2005/0273860 A1 | 12/2005 | Chess et al. | |
| 2006/0253739 A1 | 11/2006 | Godefroid et al. | |
| 2007/0143407 A1 | 6/2007 | Avritch et al. | |
| 2007/0203973 A1 | 8/2007 | Landauer | |
| 2009/0164478 A1 * | 6/2009 | Natanov et al. | 707/100 |

OTHER PUBLICATIONS

"Differential Code Coverage", Date: Jun. 16, 2005, pp. 1-16.
Faust, Sacha, "Web Application Testing with SPI Fuzzer", Date: 2005, pp. 1-30.
Juranic, Leon, "Using fuzzing to detect security vulnerabilities", Date: Apr. 25, 2006, pp. 1-18.
Medvedev Ivan, "Security Tools for Software Development", Date: 2005, http://download.microsoft.com/download/0/1/a/01a053e8-3e18-4f73-b8e7-68d53a8232da/Medvedev_SSW-2005.ppt.
Neaves, Tom, "Software Development and Information Security: an analysis, investigation and experiment into what happens when security is treated as an add-on during development.", Date: 2005, pp. 1-82.
Peter, et al., "An Overview of Vulnerability Research and Exploitation", http://www.cl.cam.ac.uk/Research/Security/seminars/2006/2006-05-16.ppt.
Newsham, et al., "Breaking Forensics Software: Weaknesses in Critical Evidence Collection", Date: Aug. 1, 2007, pp. 1-30.
Wong, et al., "A Web Services Security Testing Framework", Date: Oct. 11, 2006, pp. 1-103.

\* cited by examiner

*Primary Examiner* — John Chavis

(57) ABSTRACT

A test tool is provided for testing a software component. The tool receives data structured and formatted for processing by the software component. The structured data might conform to a schema defining valid inputs that the software component is able to parse/process. The test tool selects a discrete part of the structured data and fuzzes the selected discrete part. The test tool determines whether there are any parts of the structured data whose validity can be affected by fuzzing of the discrete part of the structured data. The fuzzed discrete part of the structured data is analyzed and a related part of the structured data is updated to be consistent with the fuzzed discrete part. The fuzzing tool passes the structured data with the fuzzed part and the updated part to the software component being tested. The software component is tested by having it process the data.

20 Claims, 6 Drawing Sheets

210

| Name | Purpose |
|---|---|
| sequential group | Multiple elements or groups in the well specified order are contained in the group. |
| single-choice group | Only one element or group out of specified list is contained in the group. |
| string element | String with ASCII or Unicode characters of variable length. Length is fixed or determined by specified terminator. |
| constant string element | Constant string with ASCII or Unicode characters. |
| numeric string element | Number encoded as string. Can be signed or unsigned. Can be integer or floating type. Valid ranges and precision is specified. |
| encoding | Any of a variety of types of coding schemes. |

HTTP Request:
Request Line: sequential group (describes the first line)
… (not needed for the example)
Authorization header: sequential group
"Authorization:" : Constant String
Spaces : String
Basics : Constant String
Spaces : String
Base64 Encoded Credentials : sequential group that encodes/decodes child elements with Base64
    Username : String
    ":" : Constant String
    Password : String

FUZZING ENCODED DATA

CROSS-REFERENCE TO RELATED APPLICATIONS

This original application is related to, but does not claim priority to, the following U.S. patent application Ser. No. 11/756,150, titled "Testing Software Applications with Schema-based Fuzzing", filed May 31, 2007; Ser. No. 11/756,782, titled "Delivering Malformed Data for Fuzz Testing to Software Applications", filed Jun. 1, 2007; and Ser. No. 11/959,469, titled "Relations in Fuzzing Data", filed Dec. 19, 2007.

BACKGROUND

Discussed below are techniques related to fuzzing encoded data for testing software for security vulnerabilities. Fuzzing is a software technique that involves repeatedly generating malformed data and submitting it to an application to test various parts of the application. Passing fuzzed data to an application often helps uncover frailties and vulnerabilities in the application. Buffer overruns, crash points, and application deadlocks are typical vulnerabilities that fuzzing reveals. Improved techniques for generating fuzzed test data are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A test tool is provided for testing a software component. The tool receives data structured and formatted for processing by the software component. The structured data might conform to a schema defining valid inputs that the software component is able to parse/process. The test tool selects a discrete part of the structured data and fuzzes the selected discrete part. The test tool determines whether there are any parts of the structured data whose validity can be affected by fuzzing of the discrete part of the structured data. The fuzzed discrete part of the structured data is analyzed and a related part of the structured data is updated to be consistent with the fuzzed discrete part. The fuzzing tool passes the structured data with the fuzzed part and the updated part to the software component being tested. The software component is tested by having it process the data.

Many of the attendant features will be explained below with reference to the following detailed description considered in connection with the accompanying drawings.

BRIEF DESCRIPTION OF THE DRAWINGS

Embodiments described below will be better understood from the following detailed description read in light of the accompanying drawings, wherein like reference numerals are used to designate like parts in the accompanying description.

FIG. 5 shows a process for fuzzing test data and using relation information to identify and modify a field related to a fuzzed field.

DETAILED DESCRIPTION

Overview

As mentioned in the Background, fuzzing may involve generating malformed, often random, input data. Embodiments discussed below relate to fuzzing of encoded test data. Problems with fuzzing encoded test data are discussed first, followed by description of techniques for fuzzing encoded test data and using same to test software applications. Some examples of use of the techniques will then be explained.

Fuzzing Encoded Data can Limit Effectiveness of Fuzz Testing

A significant proportion of software development resources are expended on security problems. Many of these security problems result from buffer overruns and crashes. Fuzzing is a testing technique that can help detect these defects and others. Fuzzing involves generating malformed data, typically by randomly selecting or generating or mutating (manipulating) data. A fuzzing tool may generate fuzzed data and submit it to an application to reveal bugs or vulnerabilities in the application. A mutating fuzzing test tool usually starts with original test data, for example a template or data generated therefrom, and mutates the data. The fuzzed test data is passed to an application being tested. Parsing code in the application may follow a normal or error free path until it reaches the malformed (fuzzed) part of the input data. Such a test may identify places in the application's code where malformed data causes the application to become unstable (for example, reaching a deadlock state) or to crash. Software developers, knowing where the application's code has a vulnerability, may make appropriate corrections.

The present inventors alone have identified problems with fuzz testing that prior fuzzing techniques were not able to address automatically. Elements or parts of test input data are sometimes structured in layers or as a hierarchy with nested or grouped parts. Some of those parts, layers, or groups may be in an encoded form. For example, they might be encoded with the Base64 algorithm or a forward error correction algorithm. They might be encoded as hexadecimal characters, encrypted data, compressed data, and other known or future forms of encoding. If an encoded part of the input data is fuzzed in its encoded form (i.e., encoded bits are altered), the encoded part may become undecodeable, or, if decodeable, structure/formatting of the part in decoded form may be lost or may be unparsable by the application being tested. That is to say, fuzzing encoded parts of test input data may make it difficult to effectively test corresponding parts of an application that are supposed to parse and/or handle those parts. Consider the following simple example.

Figure 1:
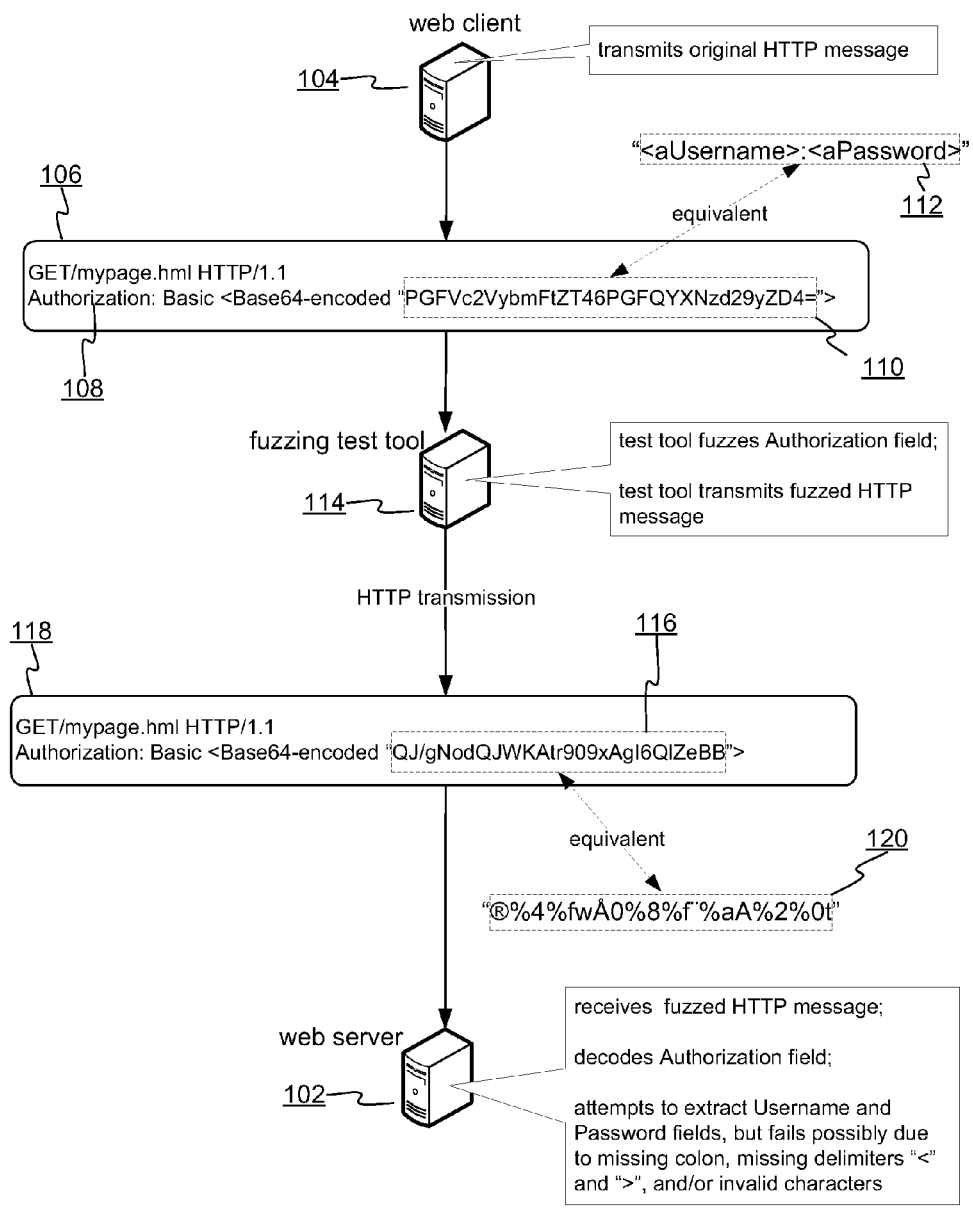
FIG. 1 shows a scenario for testing how a web server handles an HTTP communication from a web client.

FIG. 1 shows a scenario for testing how a web server 102 handles an HTTP communication from a web client 104. The web client 104 sends an original HTTP "get" request 106 addressed to web server 102. The original HTTP "get" request 106 has an Authorization field 108, which contains Base64-encoded authorization credentials 110. In the example of FIG. 1, the encoded authorization credentials 110 are encoded with the well known Base64 encoding algorithm, though any type of encoding could have been used. As shown in FIG. 1, if the encoded authorization credentials 110 in Authorization field 108 are decoded with Base64, the result is string "<aUsername>:<aPassword>" 112. In the example, "<aUsername>" and "<aPassword>" (or "aUsername" and "aPassword") stand in the place of some real username and password to be used for authorization. In the example, the characters "<" and ">" may be field delimiters or part of the dummy username and password. Note also that it might be the case that the "Base64-encoded" data is not in the original HTTP "get" request 106.

After the web client 104 transmits the original HTTP "get" request 106, a fuzzing test tool 114 intercepts the transmission. The fuzzing test tool 114 fuzzes the original HTTP "get" request 106 by replacing the encoded authorization credentials 110 with a randomly generated fuzz string 116 of "r|^93-4p\ID6_Ug_-Doi" (an Ascii string). This produces fuzzed HTTP "get" request 118, which the fuzzing test tool 114 transmits to the web server 102. When the web server 102 receives the fuzzed HTTP "get" request 118, it Base64-decodes the fuzz string 116 producing decoded Ascii string 120, which is "® % 4% fw Å0% 8% f" % aA % 2% 0t" (spaces representing non-printable characters).

There are several problems with decoded Ascii string 120. One problem is that it contains non-printable characters which may cause an error in the web server 102's initial parsing code, thus preventing the web server 102 from attempting to validate as credentials the Ascii string 120. Although the web server 102 would most likely find the Ascii string 120 to be invalid as credentials, the point is that a part of the code of web server 102 for checking credentials will not execute and therefore will not be tested. Another problem is that the decoded Ascii string 120 may not have the structure/format necessary to identify and extract a password and username. The HTTP protocol might specify that a username and password are separated by a colon (":") and/or usernames and passwords are delimited by angle brackets ("<" and ">"). However, decoded Ascii string 120 lacks these features. The web server 102, unable to isolate and extract a username and password from the Ascii string 120, will not execute its validation-attempt code and the validation-attempt code will not be tested. Note that this problem would occur even if the fuzzing test tool 114 had generated a random string that Base64-decoded into a string without non-printable characters.

It should be noted that while all content of some data will of course be in "encoded" form because all digital data is in some way an "encoding", what is of interest is the case where a portion of data is "further encoded" or is encoded in a way that other parts of the data are not. For example, a file might consist of all Ascii characters and in that sense all parts of the data are "encoded", however, a part of that file might be further encoded, meaning that although that part consists of Ascii characters, unlike other portions of the file, the Ascii characters of that part are the output of some encoding algorithm such as an encryption algorithm.

Figure 2:
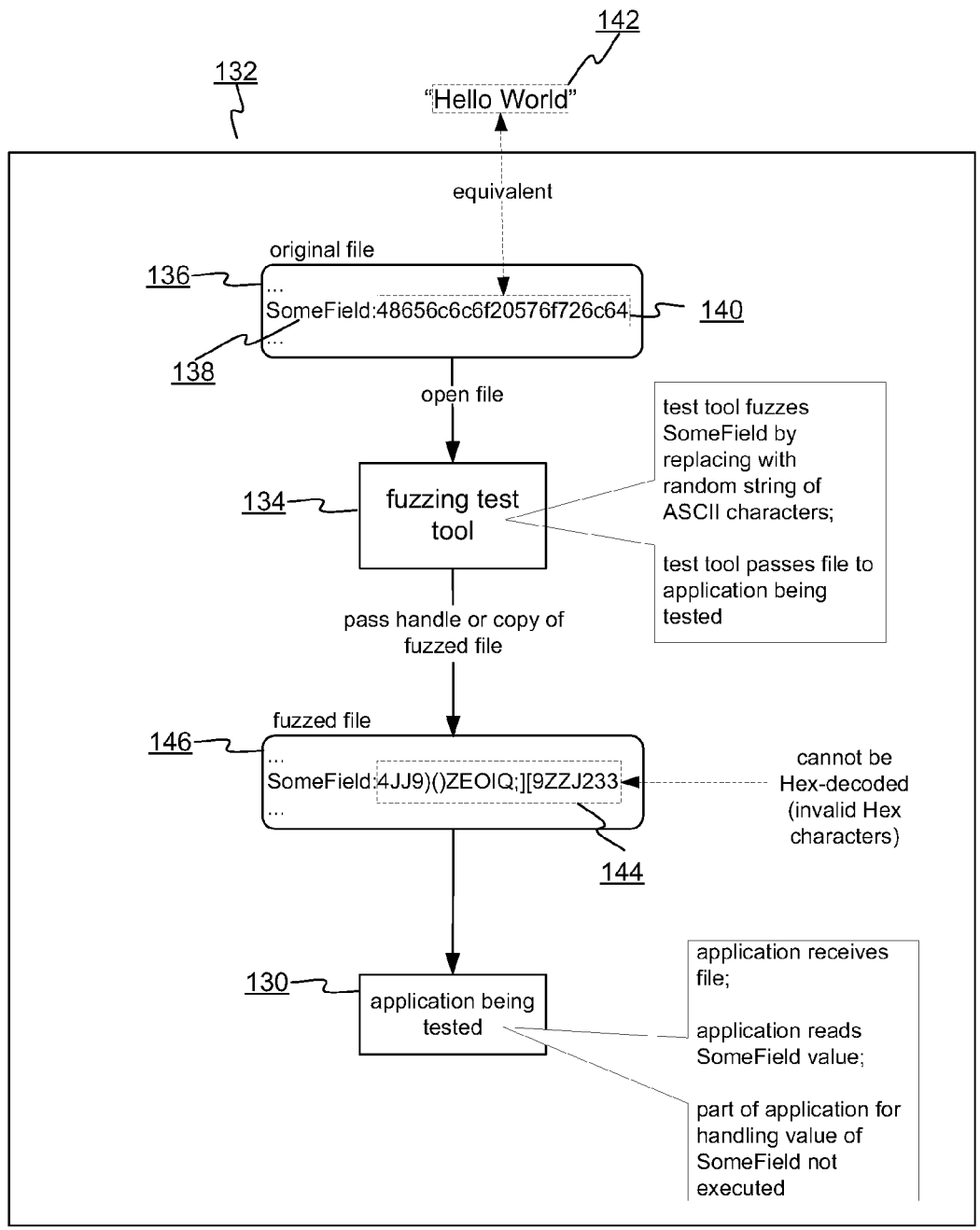
FIG. 2 shows fuzzed test input data being received by an application that is being tested.

FIG. 2 shows a scenario for testing an application 130 on a computing device 132. In cases where an application expects files of a certain format (e.g., a predefined format or a format defined by a schema), problems similar to those discussed above can occur. In this scenario, the computing device 132 has a fuzzing testing tool 134, which opens an original file 136 for testing. The original file 136 is formatted or structured as expected by the application 130; the original file 136 is well formed input. In this example, the original file 136 has an encoded field 138 which contains a Hex-encoded string 140, whose Ascii equivalent 142 is "Hello World". Fuzzing test tool 134 fuzzes the encoded field 138 by replacing Hex-encoded string 140 with a random string 144, thus producing a fuzzed test file 146. The fuzzing test tool 134 passes the fuzzed test file 146 to the application 130 being tested. The application 130 receives the file, reads the string 144, attempts to decode it from Hex, and fails because the string 144 has non-Hex characters. Part of the application 130 for substantively handling content of field 138 will not be executed. Furthermore, as with the example of FIG. 1, even if string 144 could be decoded, some underlying structure/format of the decoded content of field 138 may also be lost.

Figure 3:
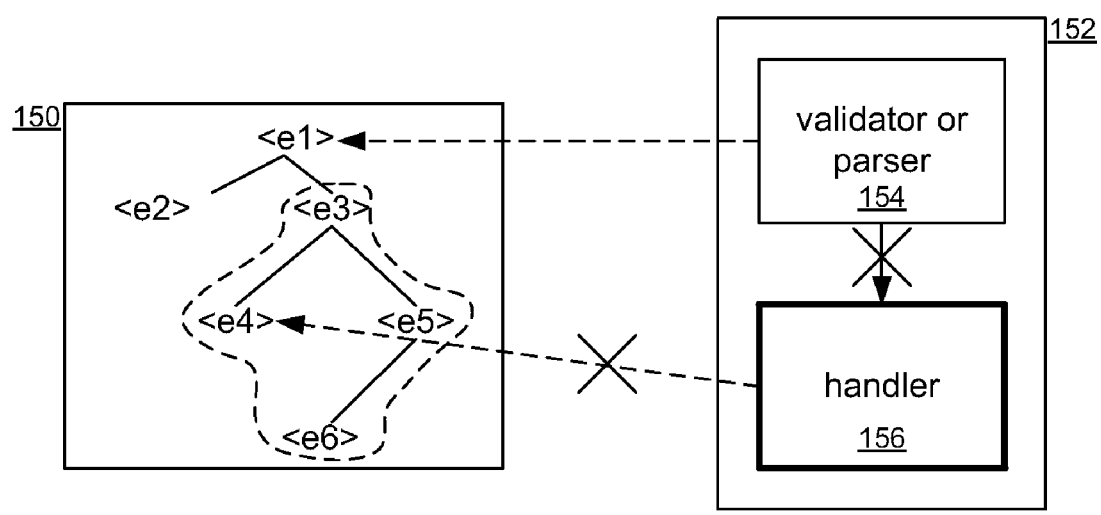
FIG. 3 shows an arrangement for generating logically consistent fuzzed test data.

FIG. 3 shows how fuzzing encoded data in test input data 150 can limit the extent to which an application 152 is tested. In this example, the test input data 150 is hierarchically structured implicitly (e.g., fields of fixed length and location) and/or explicitly (e.g., with markup, field delimiters, etc.). The application 152 has a validator or parser 154 which parses input into constituent parts and/or validates format and structure of input for the application 152. The application 152 also has a handler 156 which implements substantive logic for handling the content of element <e4>. The test input data 150 has a root element <e1> and two sub-tree elements <e2 and <e3>. Sub-tree element <e3> is assumed to be encoded, e.g., encrypted, compressed, etc. Elements <e4>, <e5>, and <e6> are contained in element <e3> and are also encoded (element <e3> could as well be a simple group or set rather than a tree). As discussed above, if the encoded content of element <e3> is fuzzed, the test input data 150 may become incapable of being validated or fully parsed by the parser 154. As explained above, due to the fuzzing of element <e3>, validator or parser 154 might fail either because it is unable to decode element <e3>, and/or because its underlying structure/content has been corrupted or rendered indiscernible. Consequently, handler 156 is not tested. Even if fuzzed element <e3> is itself validated or parsed as a whole, some element contained in <e3>, affected by the combination of the fuzzing and decoding, might cause validator or parser 154 to fail, thus making it impossible for handler 156 to handle element <e3> or a part thereof.

The examples above are for illustration only and are not intended to limit the boundaries of the invention. As discussed herein, a variety of types of inputs and encodings may be susceptible to direct fuzzing of encoded test input data. Techniques for improved fuzzing of encoded test data are explained next.

Techniques for Fuzzing Encoded Test Data

Figure 4:
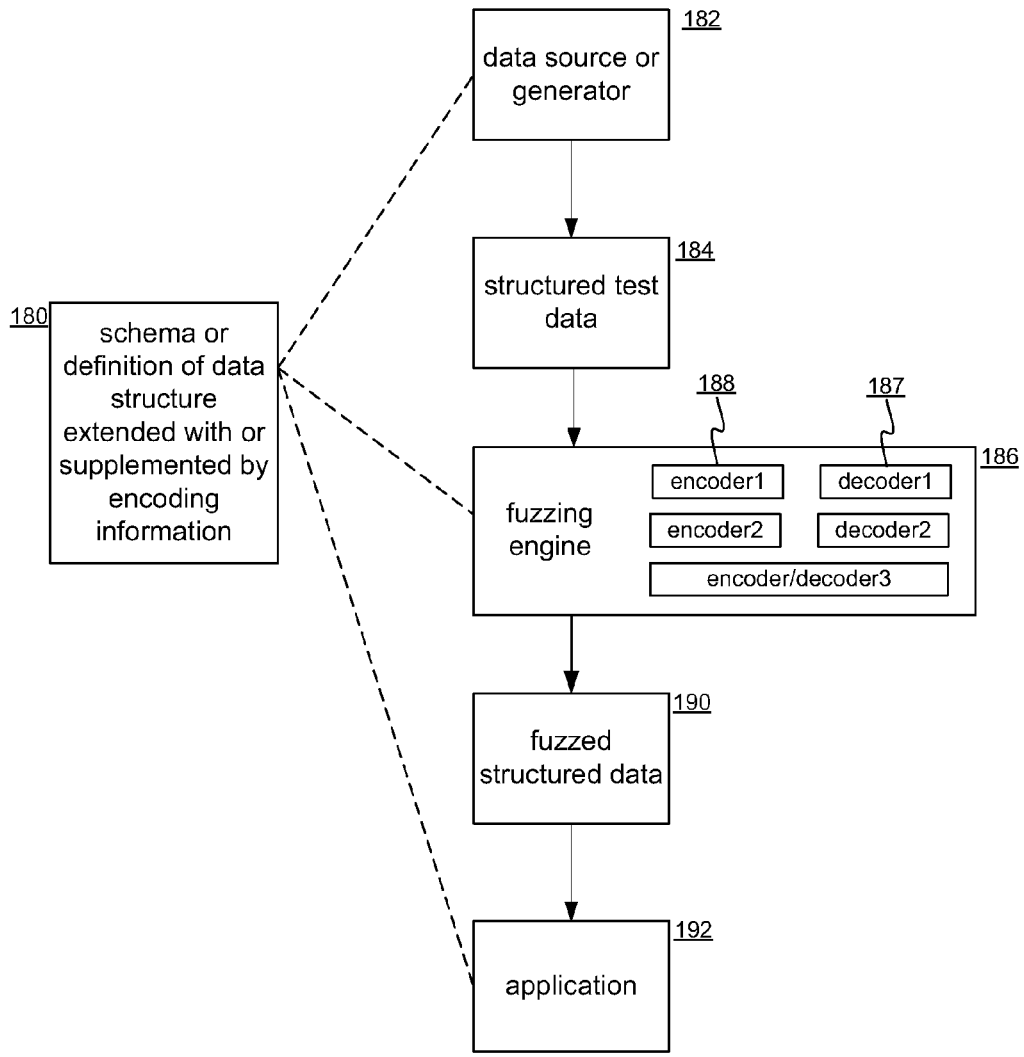
FIG. 4 shows example fuzzing schema groups and elements, and an example schema using same.

FIG. 4 shows an arrangement for fuzzing encoded test data. A schema 180 serves as a basis for fuzzing encoded input data. First, a data source or generator 182 produces structured test data 184. For example, the test data 184 can be generated from a static input template or programmatically. The structured test data 184 might be a message formed according to a communication protocol, a formatted data file, an XML document, etc. The structured test data 184 might be pre-existing data or it might be generated from a template. The structured test data 184 might be implicitly structured by having predefined fields in predefined locations. For example, it might be assumed that all input for an application will have certain fields at certain locations and perhaps with predefined lengths. The structured test data 184 might be explicitly structured, for example using markup language, field delimiters, combinations thereof, and so on. As discussed previously, one or more fields contain encoded data. In one embodiment, information describing which fields are encoded and how they are encoded is included in the schema 180.

Referring again to FIG. 4, the structured test data 184 is received by a fuzzing engine 186, which is a software component running on a computer and configured to execute as described below. The fuzzing engine 186 might receive the test data 184 by any number of means. The test data 184 could be passed to the fuzzing engine 186 as though the fuzzing engine 186 were a target application. Test data 184 addressed and sent to an application can be redirected to fuzzing engine 186. The fuzzing engine 186 can also be implemented as a proxy (such as network proxy, RPC proxy, API hooking, or other intercepting technology) that receives communications sent to an application. In another embodiment, the fuzzing engine 186 might generate the structure test data 184 rather than receive it from an external source.

After receiving the test data 184, the fuzzing engine 186 parses the structured test data 184 (possibly using schema 180), selects a part of the structured test data 184, determines that the selected part is encoded, and decodes the selected part. The decoding may be performed by selecting from multiple available decoders a decoder 187 that corresponds to an encoding algorithm by which the selected part was encoded. For example, if decoder1 is a Base64 decoder, decoder2 is a uudecoder, and encoder/decoder3 is a an AES (Advanced Encryption Algorithm) implementation (a two-way algorithm in which encoding and decoding are performed by the same algorithm), and if the selected part is uuencoded, then the uudecoder would be selected as the decoder 187. In one embodiment the schema 180 has information identifying the encoding algorithm. The encoding algorithm can also be identified by having the fuzzing engine 186 analyze the structured test data 184 and/or the selected part thereof for indicia of the encoding algorithm. For example, if the structured test data 184 is a markup language document, and if the selected part is a node thereof, the node might have a parameter such as "encoding=DES" (Data Encryption Standard). In another embodiment, the fuzzing engine 186 identifies the encoding algorithm by analyzing the encoded data of the selected part. In some cases fuzzing engine 186 cannot unambiguously determine the decoding, in this case, multiple random decoders should be tried, to explore all possibilities and ensure maximum coverage of the tested application.

Having selected decoder 187, the fuzzing engine 186 uses the decoder 187 to decode the selected part. The fuzzing engine 186 then fuzzes the decoded data. In a simple case where the selected part is only a single field or element, the decoded part is simply fuzzed (e.g. replaced with random data, randomly permuted, etc.). In another case the decoded part may itself be structured or formatted (e.g., a header or tail of a packet). For example, the decoded part might have a set of fields, a tree of fields, a table of data, etc. The fuzzing engine 186 learns of the structure or format of the decoded part from the schema 180. Knowing how the decoded part is structured or formatted, the fuzzing engine 186 constructs in memory a corresponding data structure with the decoded data. The fuzzing engine 186 can then fuzz the data structure while maintaining structure or formatting that is consistent with the format or structure defined in the schema 180. The decoded part (as formatted/structured in memory) can be fuzzed by randomizing an element thereof, adding or removing one or more random elements (if consistent with the schema 180), adding or replacing an element with a lengthy bit pattern, etc.

Having fuzzed the decoded part of the structured test data 184, the fuzzing engine 186 then selects an encoder 188 from among different available encoders. The fuzzing engine 186 selects the encoder 188 that corresponds to the previously identified encoding algorithm. That is, fuzzing engine 186 selects an encoder whose output can be decoded by decoder 187. If a uudecoder was used to decode the selected part, a uuencoder is used to encode the fuzzed part. The encoder 188 is then used to encode the fuzzed data in memory. The fuzzing engine 186 then generates fuzzed structured data 190 by replacing the selected part of the original structured test data 184 with the corresponding data that has been fuzzed and encoded. The net effect is that an encoded part of the input structured test data 184 has been fuzzed while preserving the encoding and while also preserving the integrity (e.g., structure/formatting) of the encoded data.

Finally, the fuzzed structured data 190 is made available or passed to the application 192, which among other things decodes the encoded-fuzzed part and attempts to process the fuzzed content. Because the encoding and underlying format/structure has been maintained in the test data, a more thorough testing of the application 192 is likely. In particular, "deep" logic of the application 192 is more likely to be reached because the application 192 will determine that much of the input data (perhaps up the point of encountering fuzz data) is valid.

While the fuzzing engine 186 is shown as a discrete component in FIG. 4, the functions performed by the fuzzing engine 186 could also be performed elsewhere. For example, a testing program for generating original input data could also implement logic for fuzzing encoded parts thereof. Furthermore, the encoders and decoders need not be a part of the fuzzing engine 186 but could be in libraries or modules available to the fuzzing engine 186. The encoding/decoding functionality of the encoders and decoders can also be implemented in one module. Implementation details are not important so long as the fuzzing process is able to decode and encode various encoding schemes.

FIG. 5 shows example fuzzing schema groups and elements 210, and an example schema 212 using same. While any number of types of schema may be used, a tree-based schema is convenient for describing the format, structure, and encoded parts of input data. An XML schema can also be used, if fuzzed data is in XML format. If an XML schema already exists for validating input data, it is convenient to extend such a schema with encoding information. Valid input data can also be described with a language perhaps in Augmented-Backus-Naur Form (ABNF) syntax. Alternatively, valid input can be mostly undescribed and a schema may simply have encoding information without regard for the structure of the input. Nonetheless, it will be convenient for many software testing tools to have a schema that describes valid input for an application, and it will be convenient to include encoding information in association with such schema.

While there are many ways to handle encoded input data, it is convenient to extend a tree-based fuzzing data schema. A fuzzing data schema describes the appearance and properties of well formed input for an application. A fuzzing schema should decompose the described input data into groups of other groups or elements and primitive (atomic) elements themselves. Groups may be recursive if needed. That is, one group can contain other groups or primitives. For each element, its type and valid formats thereof should be described. For variable length fields, it may be helpful to include information describing how to detect termination of the field (e.g., whitespace, special character, etc.). An example of fuzzing schema groups and elements 210 is shown in FIG. 4. Two types of groups are allowed (sequential and single-choice), and three primitives—string, constant, and numeric—are also allowed. Any of these may be designated as being encoded. Example schema 212 is a description for the original and fuzzed HTTP "get" requests 108, 118 in FIG. 1. Schema 212 uses the example schema groups and elements 210 to describe valid input and an encoded part thereof, namely, the credentials element 214.

At the end of the schema 212 there is the "Base64 Encoded Credentials" element 214, which is an encoded group of string elements, the group having been encoded as a whole.

This field identifies an encoded element of input data and also the type of encoding, which is Base64. This encoding information can be used to implement any of the methods described above. In this example, the schema 212 has information about the structure and content of the encoded credentials. A fuzzing tool can use this information to decode a credentials element of an input file or message, fuzz a username and/or password while maintaining the colon, and then re-encode the fuzzed credentials. An application being tested should be able to extract from the fuzzed input file or message the fuzzed username and/or password.

Figure 6:
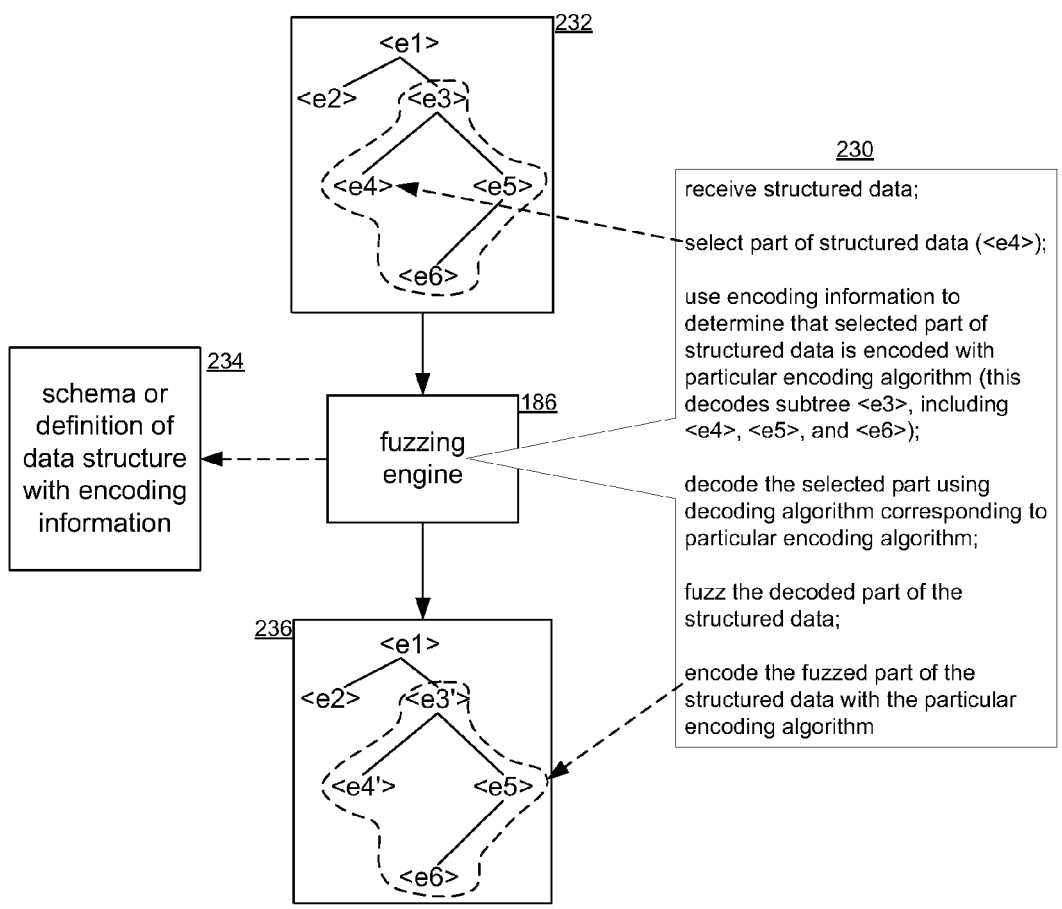
FIG. 6 shows an example input data.

FIG. 6 shows a process 230 for fuzzing test data and using encoding information to identify and fuzz an encoded part of the test data. While embodiments may select an encoded element for fuzzing, there is also an embodiment where a sub-element of an encoded input element may itself be selected for fuzzing. In this case, fuzzing engine 186 first receives structured data 232 that is to be fuzzed. Optionally using schema 234, without regard for the encoding of element <e3>, the fuzzing engine 186 selects field <e4> to be fuzzed. The field can be selected randomly or it can be selected by an overall testing controller that systematically iterates over various fields of input data, fuzzing and testing each in turn. Schema 234 can be used to parse the input data 232 and to find the field to be fuzzed. In addition in to attempting to find defects in the decoding code of the tested application, a testing controller should occasionally attempt to:

1) fuzz encoded data instead of attempting to decode it
2) attempt fuzzing after decoding, fuzzing and encoding it back After selecting an element, <e4>, to be fuzzed, the fuzzing engine 186 uses encoding information in the schema 234 to determine that element <e4> is encoded by way of the encoding of element <e3>. Element <e3> is decoded according to the type of algorithm with which it has been encoded. The decoded element <e3> comprises a decoded subtree (other non-tree structures are possible) with decoded elements <e4>, <e5>, and <e6>. Element <e4> is fuzzed, either by replacing its content, adding a subelement (e.g., <e7>), deleting <e4> or its content, and so on. All of these possibilities are represented by element <e4'>. Because the schema describes the structure/format of the content of element <e3>, element <e4> can be fuzzed without necessarily affecting the overall structure of element <e3> and without losing the identity of element <e4>/<e4'> within element <e3>.

In a preferred embodiment, using schema 234, the structured data 232 is parsed and formed as a temporary data structure stored in a memory buffer. The data structure might be a tree with nodes/elements corresponding to fields/elements in the structured data 232. In another embodiment, the structured data 232 is parsed and manipulated in place, for example in a buffer. In either case, the fuzzed value is eventually stored in the field <e4'>. With either embodiment, the final result is structured data 236 which has fuzzed field <e4'> within an encoded part of the structured data 236. The structured data 236 is passed to the application that is to be tested, which parses and processes the data.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed by a computing device. The embodiments and features can be performed on any type of computing device, including portable devices, workstations, servers, mobile wireless devices, and so on.

The invention claimed is:

1. A method performed by a computing device configured with a test tool for generating test data to test a software component, the method comprising:

receiving structured/formatted data, the structured data conforming to a format or schema of valid inputs that the software component is able to parse and process;

selecting a discrete part of the structured/formatted data for fuzzing and identifying a particular encoding algorithm with which the structured/formatted data has been encoded;

based on the identified particular encoding algorithm, selecting from among plural decoders a decoder corresponding to the encoding algorithm;

decoding the discrete part of the structured/formatted data with the selected decoder;

fuzzing at least a portion of the decoded discrete part of the structured/formatted data;

selecting from among plural encoders an encoder corresponding to the particular encoding algorithm;

encoding the decoded and fuzzed discrete part of the structured/formatted data; and passing to the software component being tested the structured/formatted data with the fuzzed part.

2. A method according to claim 1, wherein the identifying the particular encoding algorithm comprises:

accessing encoding information, separate from the structured/formatted data, that was stored before the structured/formatted data was received and that identifies the particular encoding algorithm and has information that the tool can use to find a portion of the structured/formatted data that is encoded with particular encoding algorithm.

3. A method according to claim 2, wherein the selecting comprises using the encoding information to find the discrete part of the structured/formatted data.

4. A method according to claim 1, wherein the received structured/formatted data is a valid instance of data defined by a schema, the schema including encoding information that indicates that a data field defined by the schema is encoded by the particular algorithm, the selected discrete part comprising an instance of that data field.

5. A method according to claim 4, wherein the data field comprises a group of other data fields.

6. A method according to claim 1, wherein the encoding algorithm is identified by analyzing the structured/formatted data.

7. A method according to claim 1, wherein the structured/formatted data includes a group-field comprising a group of other fields, the group-field being encoded with the encoding algorithm, the selected part of the structured/formatted data comprises one of the fields in the group-field, the decoding comprises decoding the group-field, and the encoding comprises encoding the group-field with the fuzzed part.

8. One or more volatile and/or non-volatile computer readable media storing information to enable a computer to run a software testing tool to perform a process of fuzzing a test file to be used to test an application, the process comprising:

accessing the test file, the test file containing structured content, the structured content comprising a plurality of fields formatted and arranged in accordance with a predefined format that the application is configured to parse, the content including at least a first field containing a second field, the first field and second fields having been encoded as a group with an encoding algorithm, where other parts of the structured content are not encoded by the encoding algorithm;

identifying the encoding algorithm and in accordance therewith decoding as a group the first and second fields and fuzzing the decoded second field but not the first field;

encoding as a group the first and second fields with an encoding algorithm corresponding to the decoding algorithm and generating a fuzzed test file by replacing in the test file the original encoded first and second fields with the encoded first field and fuzzed second field; and testing the application by processing the fuzzed test field with the application.

9. One or more volatile and/or non-volatile computer readable media according to claim 8, wherein the second field is selected for fuzzing by using a schema that defines valid test data for the application and parsing the test file according to the schema.

10. One or more volatile and/or non-volatile computer readable media according to claim 8, wherein if the first and second fields in encoded form were fuzzed the second field would be able to be identified.

11. One or more volatile and/or non-volatile computer readable media according to claim 8, further comprising constructing a representation of the test file in memory, the first and second fields are decoded in the representation of the test file, the second field is fuzzed in the representation of the test file, the first and second fields are encoded in the representation, and the fuzzed test file is generated from the representation.

12. One or more volatile and/or non-volatile computer readable media according to claim 11, wherein the representation is generated using a schema describing valid input for the application.

13. One or more volatile and/or non-volatile computer readable media according to claim 12, wherein the pre-defined format comprises the schema and the received test file comprises a markup language document capable of being validated against the markup language schema.

14. One or more volatile and/or non-volatile computer readable media according to claim 13, wherein schema includes encoding information that the testing tool uses to identify the decoding algorithm.

15. A computing device configured to be capable of performing a process for fuzz-testing a computer program, the process comprising:

preparing input data for fuzz-testing the computer program by:

parsing original input data to identify a field therein, the input data comprising valid input for the software application, the input data comprising a plurality of discrete fields and values therein, wherein the identified field is in encoded form such that substantive content of the field cannot be accessed without decoding the identified field, the identified field being in encoded form in the input data, the identified field having been encoded by a particular encoding algorithm, the other fields not having been encoded by the encoding algorithm;

decoding the selected field element of the input data using a decoding algorithm corresponding to the encoding algorithm;

performing a fuzzing operation on the decoded data field and then encoding the data field with the encoding algorithm; and storing input data including the fuzzed and encoded data field.

16. A computing device according to claim 15, wherein the encoding algorithm comprises an algorithm to translate from one format to another.

17. A computing device according to claim 15, further comprising using predefined information describing the format of the selected field to perform the fuzzing operation.

18. A computing device according to claim 15, wherein the input data comprises a message that conforms to a communication protocol.

19. A computing device according to claim 15, wherein the input data comprises markup code defining elements and content within the elements, the selected field comprising an element.

20. A computing device according to claim 15, wherein the preparing further comprises using a schema, which defines valid input for the computer program, to parse the input data and to identify the encoding algorithm.

* * * * *